United States Patent [19]
Kern

[11] 3,721,171
[45] March 20, 1973

[54] PRINT STRIPPING DEVICE

[75] Inventor: Frederick W. Kern, Fairport, N.Y.

[73] Assignee: Eastman Kodak Company, Rochester, N.Y.

[22] Filed: March 29, 1972

[21] Appl. No.: 239,014

[52] U.S. Cl. ..................................95/13, 95/89 R
[51] Int. Cl. ...........................................G03b 17/50
[58] Field of Search ................................95/13, 89 R

[56] References Cited

UNITED STATES PATENTS 3,424,072  1/1969  Hodgson et al. ..........................95/13

Primary Examiner—Richard L. Moses
Attorney—W. H. J. Kline et al.

[57] ABSTRACT

A self-processing camera is provided for use with film units comprising a preregistered, integral image-recording unit separably attached along its lateral margins to side rails of a rigid frame. As each film unit moves endwise in the camera during processing, its image-recording unit is separated from the frame and ejected through an exit slot in the camera housing to provide the desired photographic print. A novel stripping device initiates the separation at a leading corner of the image-recording unit and then progressively detaches that unit from the frame by means of an angularly disposed stripping shoe that guides the image-recording unit into and through the exit slot.

7 Claims, 11 Drawing Figures

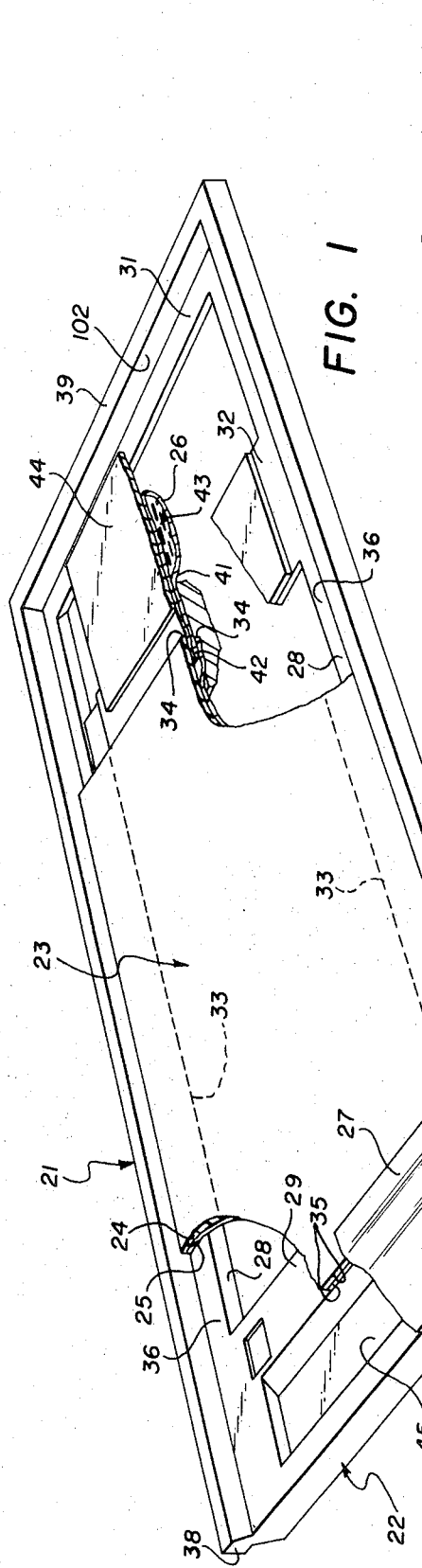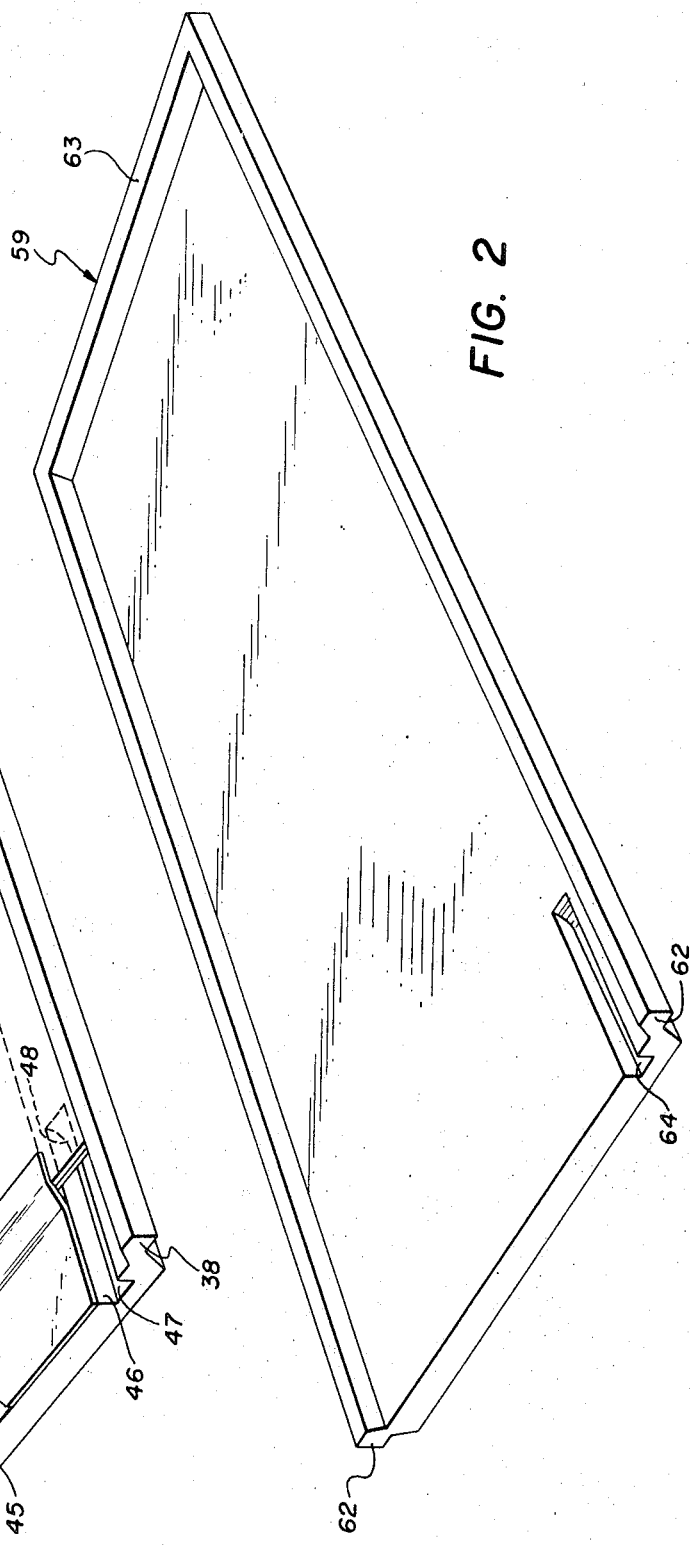

PATENTED MAR 20 1973

PRINT STRIPPING DEVICE

CROSS-REFERENCE TO RELATED APPLICATIONS

Reference is made to commonly assigned, copending U.S. Pat. Applications Ser. No. 111,464, entitled FILM TRANSPORTING MECHANISM and filed Feb. 1, 1971 in the name of Donald M. Harvey; Ser. No. 111,472, now U.S. Pat. No. 3691920 entitled STRIPPING MECHANISM and filed Feb. 1, 1971 in the name of Donald M. Harvey; and Ser. No. 159,323, entitled PRINT STRIPPING MECHANISM and filed July 2, 1971 in the name of Donald M. Harvey.

BACKGROUND OF THE INVENTION

1. Field of the Invention

The present invention relates to cameras adapted for use with self-possessing film units comprising a preregistered, integral image-recording unit separably attached to a rigid frame, and more specifically to improved means in such a camera for separating the image-recording unit from the frame.

2. Brief Description of the Prior Art

It is well known in the photographic art to provide film units with materials for processing the units immediately after their exposure. Generally, such film units include an image-recording unit having a photosensitive sheet comprising a support for one or more layers of photosensitive material and a second or process sheet adapted to be registered with the photosensitive sheet during processing. A viscous processing composition is supplied to the image-recording unit at one end and is spread toward the other end by passing the film unit between juxtaposed pressure-applying members that distribute the composition in a layer of predetermined thickness between the two sheets. The distributed composition permeates the image-recording unit to develop the photosensitive layer(s) and to establish an image in a mordant layer, located in either the photosensitive sheet or the process sheet, to provide a substantially permanent, visible photograph.

In a presently popular commercial film unit, generally referred to as the "peel-apart" type, the photosensitive and process sheets are spaced apart during exposure and are superposed for processing. The image-or print-receiving layer is in the process sheet, and that sheet is stripped from the rest of the unit after processing to provide a positive, right-reading print. Such a film unit is disclosed, for example, in U.S. Pat. Nos. 3,080,805 and 3,511,659.

The present invention is concerned with a different type of image-recording unit, generally referred to as being "preregistered" or "integral." The photosensitive and process sheets of a preregistered image-recording unit are superposed or registered prior to exposure, while the same sheets of an integral image-recording unit are maintained in superposed or registered relation during and after processing. More particularly, the present invention is disclosed in connection with a film unit comprising an image-recording unit that is both preregistered and integral. This type of image-recording unit includes photosensitive and process sheets, or elements, that are superposed prior to exposure and define a composite, permanently registered structure designed to remain substantially in the same physical form after processing. In the presently known image-recording units of this type, which are illustrated with the preferred embodiment of the present invention, the second or process element is transparent to permit exposure of the photosensitive layer(s) from that side of the unit. The image-or print-receiving layer may be located in the process element, or, preferably, it may be located in the photosensitive element to provide a positive image that need not be stripped from the rest of the unit. The processing composition introduced between the two sheets provides an opaque white background for the final photographic image and prevents further exposure from occurring before the processing composition has had time to complete its processing functions. Specific details about film units comprising image-recording units of the preregistered, integral type are disclosed, for example, in commonly assigned U.S. Pat Application Ser. No. 027,990, entitled PHOTOGRAPHIC FILM UNIT FOR DIFFUSION TRANSFER PROCESSING, filed Apr. 13, 1970 in the name of Harold E. Cole and now abandoned, and in French Pat. Nos. 2,006,255 and 2,006,256, published Dec. 26, 1969.

To facilitate handling an image-recording unit of the type just described, the unit can be removably attached to a substantially rigid, but somewhat flexible, plastic frame which also carries a processing fluid pod and an excess fluid trap. The pod supplies processing composition to one end of the image-recording unit, and the trap collects any excess processing composition from the other end. The image-recording unit is releasably or strippably coupled to side rails of the frame along its lateral edges while the pod and trap are permanently attached to end bars of the frame, thereby allowing the image-recording unit to be separated from the frame, the pod, and the trap after initiation of the processing that converts the image-recording unit into a finished print.

To separate the image-recording unit from the frame, it has been proposed to provide the frame with grooves or slots which extend along its side rails in confronting relation to marginal surfaces of the image-recording unit attached to those rails. As the film unit moves endwise along a predetermined processing path in the camera, a pair of pointed stripping fingers enter those grooves to wedge the leading end of the image-recording unit out of engagement with the frame rails and to guide that end into an exit slot in the camera housing. For purposes of the present disclosure, it will be understood that the terms "leading end" and "trailing end" refer to those ends of the film unit or image-recording unit that are first and last, respectively, to encounter the stripping device, regardless of the direction of movement of the film unit during the separating operation. An example of this type of stripping device is disclosed, for example, in commonly assigned, copending U.S. Pat. Application Ser. No. 111,472, entitled STRIPPING MECHANISM and filed Feb. 1, 1971 in the name of Donald M. Harvey.

During experimentation with print separating devices of the type described above, it has been found that successful performance of such devices requires rather critical design of the stripping fingers and the related guide surfaces, and the performance is also quite dependent on the stiffness of the image-recording unit and the strength of the adhesive by which that unit is bonded to the frame rails. Upon an analysis of malfunctions of such devices, it has been discovered that the critical nature of those parameters results from the fact that the stripping fingers tend to bow the leading edge of the image-recording unit longitudinally at the same time that edge must bow transversely to enter the exit slot. Because the normally flat image-recording unit resists being bowed simultaneously in two different directions, these opposing tendencies work in opposition to each other and produce jamming or buckling effects unless the transverse bowing forces are sufficient to overcome the opposing longitudinal bowing forces.

SUMMARY OF THE INVENTION

The principal objects of the present invention are to improve the performance of a print stripping device of the general type described above and to simplify the design and construction of such a device. Briefly, these and other objects are accomplished in accordance with the present invention by means of an improved stripping device that initiates the stripping operation at only one leading corner of the moving image-recording unit and then progressively strips the unit from the frame by means of an angularly disposed stripping shoe that guides the leading end of the unit into and through the camera exit slot. Because such an arrangement initially separates only one leading corner of the image-recording unit from the frame, it substantially eliminates the longitudinal bowing tendency, thus allowing the image-recording unit to bend or bow easily along an angular transverse flexure region as it moves into and through the exit slot.

Various means for practicing the invention and other advantages and features thereof will be apparent from the detailed description of the preferred embodiment of the invention presented below.

BRIEF DESCRIPTION OF THE DRAWINGS

In the detailed description of the preferred embodiment of the invention presented below, reference is made to the accompanying drawings wherein like reference numerals denote like elements and wherein:

FIG. 1 is a perspective view of the normally rearward-facing side of a preregistered, integral film unit of the type with which the present invention is concerned;

FIG. 2 is a perspective view of the normally rearward-facing side of a cover plate used in combination with a plurality of film units of the type shown in FIG. 1 to provide a film unit assemblage;

DESCRIPTION OF THE PREFERRED EMBODIMENT

Figure 3:
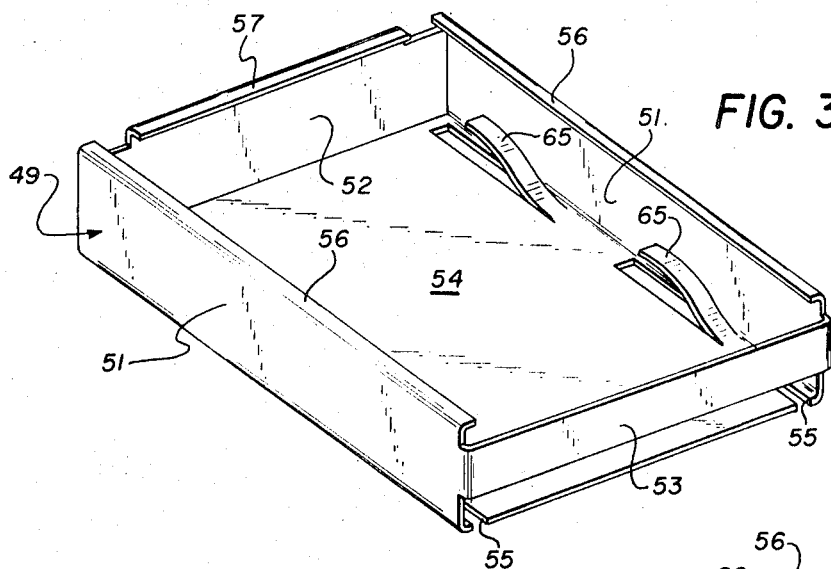
FIG. 3 is a perspective view of a film pack casing adapted to receive a film unit assemblage comprising a plurality of film units of the type shown in FIG. 1 and cover plates of the type shown in FIG. 2.

Because photographic cameras and film units of the self-processing type are well known, the following description is directed in particular to elements forming part of, or cooperating directly with, the present invention, elements not specifically shown or described herein being selectable from those known in the art.

By reference to FIG. 1 of the drawings, a typical preregistered, integral film unit 21 of the type described above will be seen to comprise a frame 22, an image-recording unit 23 including a rearwardly disposed photosensitive sheet 24 and a forwardly disposed transparent process sheet 25, a processing fluid pod 26, and a trap or collector cover sheet 27. As previously mentioned, the image-recording unit is exposed from its forward side, through the transparent process sheet 25, but the finished print is viewed from the rearward face of the photosensitive sheet 24 depicted in FIG. 1. The frame 22 preferably is made of an opaque, generally rigid but somewhat flexible, plastic material and includes two side rails 28 that are joined at one end by a trap bar 29 and at the opposite end by pod end bar 31 and a cross bar 32.

As described in greater detail in the above-identified U.S. Pat. application Ser. No. 111,472, the two sheets 24 and 25 of the image-recording unit preferably are rectangular and co-extensive with each other and may be maintained in registered or superposed facing relation by any appropriate edge seal or connection. Regardless of the particular type of edge seal or connection or its manner of application, the two sheets are secured substantially in direct contacting relation to each other along their lateral marginal edges in such a manner that the central exposure areas of the sheets, outlined in FIG. 1 by broken lines 33, are retained in registered overlying relation but may be spread apart sufficiently to permit the distribution of a processing composition therebetween. Similarly, the two sheets are resiliently separable from each other to permit the introduction of the processing composition between their pod ends 34 and the collection of any excess processing composition from between their trap ends 35.

As shown at numeral 36, the side rails of the frame provide flat, rearwardly facing mounting surfaces to which the marginal edges of the image-recording unit are separably secured, preferably by a rupturable adhesive material. Beyond the lateral edges of the image-recording unit, edge ribs 38 extend rearwardly from the frame and are joined at the pod end by a similar end rib 39. As described in detail below, these ribs serve as light barriers when a plurality of film units are assembled into a film unit assemblage and also perform guiding functions as successive film units are removed from and replaced into the assemblage.

The processing fluid pod 26 may include various cooperating parts which define a suitable processing composition supplying means. Preferably, pod 26 includes a rupturable containing part 41 comprising a rectangular piece of vapor-impervious material that is folded along one edge and sealed along its lateral sides. The discharge end 42 of the pod, sometimes referred to as a funnel, is inserted between the adjacent ends 34 of the photosensitive and process sheets. A rupturable seal is provided along substantially the entire length of discharge end 42 and is adapted to release processing fluid composition 43 from the container upon application of hydraulic forces generated by passing the pod between a pair of juxtaposed pressure-applying members, as described below. The fluid containing part 41 is permanently cemented to a cardboard shim 44 which, in turn, is permanently attached to the film unit frame.

The trap bar 29 is provided with a shallow, forwardly facing trap or collector recess 45. The leading edge of the vapor-impermeable cover sheet 27 overlies the adjacent ends 35 of the photosensitive and process sheets, and the other three edges of sheet 27 are cemented or otherwise permanently attached to the frame adjacent to recess 45. Any excess processing fluid extruded from between ends 35 of the photosensitive and process sheets is therefore received and stored in the collector chamber or trap covered by sheet 27.

Figure 10:
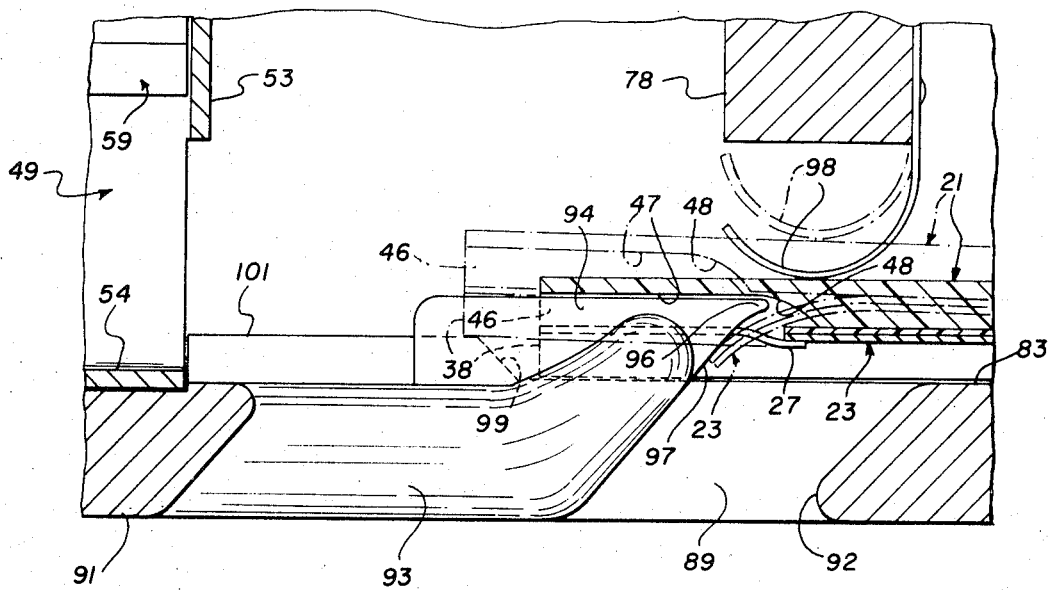
FIGS. 10 and 11 are enlarged, fragmentary, cross-sectional views of the portion of the camera shown in FIG. 7, illustrating the operation of the stripping device therein constructed in accordance with the preferred embodiment of the present invention.

The trap cover sheet 27 does not extend across the full width of the image-recording unit but only slightly past the edges of the exposure area or separable interface between the photosensitive and process sheets, which is approximately the same width as the trap recess 45. Beyond one of the lateral edges of the cover sheet, the frame is provided with a stripping finger groove 46 which is overlapped by the corresponding corner of the trap end of the image-recording unit releasably bonded to the frame. As best shown in FIGS. 1 and 10, this groove is open to the corresponding end of the frame, and its base surface 47 is provided at its blind end with a curved or sloping end portion 48 behind the overlapping corner of the image-recording unit. The only significant difference between this film unit and that disclosed in the aforementioned U.S. Pat. application Ser. No. 111,472 is that the latter unit includes a stripper finger groove at each side of the frame instead of just one groove. It should be obvious, however, that a film unit having two such grooves would be entirely compatible with the stripping device of the present invention, and that the second groove has been omitted from this film unit simply because it would serve no useful purpose. Also, it should be understood that the dimensions of various features of this film unit have been exaggerated in the drawings for purposes of clarity, and that the stripping finger groove in an actual film unit is somewhat narrower and shallower than that shown.

The film units described above preferably are supplied in a film pack comprising a plurality of such units loaded into a film pack casing 49, best shown in FIG. 3. The casing is made of plastic or sheet metal and comprises side walls 51, a full end wall 52, an opposite partial end wall 53, and a rearward wall 54 provided with two rectangular notches 55 adjacent to side walls 51. Lateral retaining lips 56 project inwardly from the forward edges of the side walls, and a similar end retaining lip 57 likewise projects inwardly from the forward edge of end wall 52.

Figure 4:
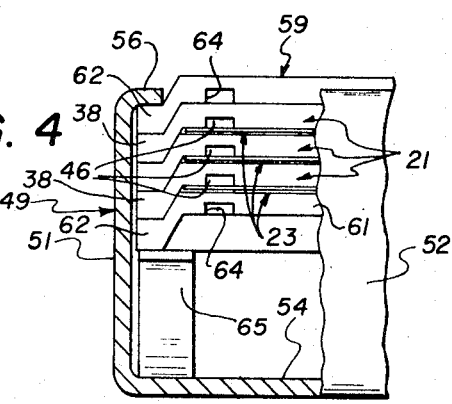
FIG. 4 is a fragmentary, partially cross-sectioned, end view of a fully loaded film pack of the type shown in FIG. 3.

FIG. 4 illustrates a fully loaded film pack, which is depicted as comprising a film unit assemblage including three film units 21 initially sandwiched between forward and rearward cover plates 59 and 61. The cover plates, which serve to protect the film units when the film pack is not installed in a camera, are of the same exterior dimensions as the film units, and each includes similar edge ribs 62 and an end rib 63, best shown in FIG. 2. As illustrated in FIG. 4, the edge and end ribs of the cover plates and film units cooperate in an overlapping or labyrinth manner to make the film unit assemblage substantially light-tight except along its trap end, which is protected from light by confronting the inner face of casing end wall 52. For reasons explained below, each cover plate also is provided with a stripping finger groove 64 which corresponds to the groove 46 in each film unit frame. Four leaf springs 65 are formed integrally with the rearward wall 54 of the film pack casing and bias the film unit assemblage forwardly into contact with retaining lips 56 and 57. Because partial end wall 53 is narrower in a forward-to-rearward direction than walls 51 and 52, it will be seen that the forward cover plate 59 or the forwardmost film unit 21 of the assemblage can be slid out of the film pack casing at that end can be reinserted into the casing at the rear of the assemblage through the casing opening between walls 53 and 54.

Figure 5:
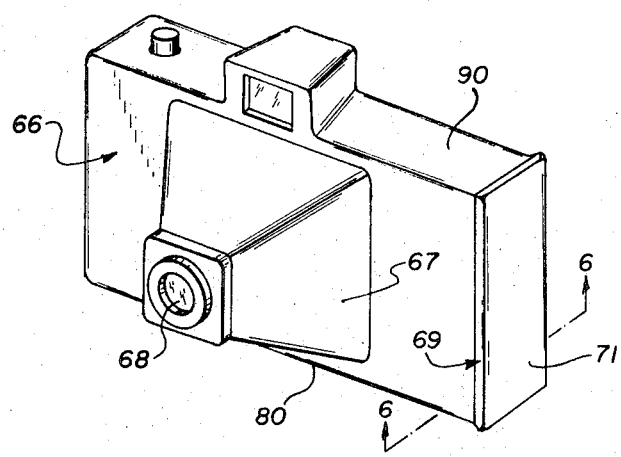
FIG. 5 is a perspective view of a camera incorporating a stripping device constructed in accordance with the preferred embodiment of the present invention.

By reference to FIG. 5, the camera incorporating the preferred embodiment of the present invention will be seen to comprise a rectangular housing 66 provided with bottom and top walls 80 and 90, respectively, and a rigid, forwardly extending enclosure 67 that supports the camera lens 68 and an appropriate shutter and diaphragm mechanism, not shown. When the film pack is loaded into the camera, it is accurately positioned within housing 66 so that, after forward cover plate 59 is removed, the photosensitive sheet of the forwardmost film unit 21 seated against the film pack casing lips 56 and 57 is coincident with a focal plane of the camera lens. A drawer or frame transporter 69 is slidably mounted within housing 66 and can be reciprocated manually, by means of an accessible end wall 71, between its closed position shown in FIG. 5 and its open position shown in FIG. 6. Specific details of such a drawer or film transporting mechanism are disclosed in commonly assigned, copending U.S. Pat. application Ser. No. 111,464, now U.S. Pat. No. 3691920 entitled FILM TRANSPORTING MECHANISM and filed Feb. 1, 1971 in the name of Donald M. Harvey. For purposes of the present disclosure, it will suffice to understand that drawer 69 includes a pair of opposed side bars 72 that straddle the film pack casing, one of such bars being depicted in FIG. 6. Each side bar, in turn, includes a rib 73 that lies forwardly of the corresponding film pack casing lip 56 and that carries a hook 74. When the drawer is in its fully closed position, hooks 74 are received between the corresponding ends of casing end lip 57 and the lateral casing lips 56 and are engageable with the adjacent end edge of forward cover plate 59 or the forwardmost film unit 21 of the assemblage, whichever is seated against lips 56 and 57. As the drawer is pulled to its open position, hooks 74 push the engaged cover plate or film unit out of the film pack casing and between a pair of opposed pressure rollers 75 and 76 that are biased toward each other by resilient spring means, not shown. When the trap end of the cover plate or film unit has passed beyond the pressure rollers, it is supported temporarily by the forward face 77 of stripper guide bar 78, which is mounted on the camera housing by pins 79 extending through slots 81 in the drawer side bars 72. Guide bar 78 therefore maintains the trap end of the moving cover plate or film unit in engagement with hooks 74, as shown in broken lines in FIG. 6, until just before the drawer has reached its fully open position.

A light leaf spring 82 is attached to the rearward surface of each drawer bar rib 73 and is compressed between that rib and the corresponding casing lip 56 when the drawer is closed. During the opening movement of the drawer, springs 82 engage the front margins of the moving cover plate or film unit and urge the engaged plate or unit rearwardly with a light resilient force. When the drawer has reached its fully open position, the plate or film unit has passed beyond guide bar 78 and can then be moved rearwardly by springs 82 to the position shown in solid lines in FIG. 6, so that its trap end rests on a rearward guide surface 83 of the camera housing while its pod end rests on support surfaces 84 of a pair of pusher fingers 85 carried by drawer wall 71. As shown in FIG. 7, surface 83 of the camera housing is located between a pair of slots 86 that accommodate the pusher fingers 85, and is straddled by a pair of converging lateral guide surfaces 87. In its rearward position just described, the cover plate or film unit is thus in endwise alignment with the opening between casing walls 53 and 54. During closing movement of the drawer, therefore, shoulders 88 of fingers 85 push the cover plate or film unit into the rearward compartment of the film pack casing, whereupon stacked springs 65 bias the plate or unit forwardly into engagement with the other elements of the assemblage. The closing of the drawer also returns hooks 74 to their initial position adjacent to the trap end of the then forwardmost film unit seated against the forward casing ribs. Accordingly, it will be apparent that repetitive opening and closing movements of the drawer will cause each successive film unit of the assemblage to be removed from its forwardmost position in the film pack and then reinserted into the film pack at the rear of the assemblage.

Figure 6:
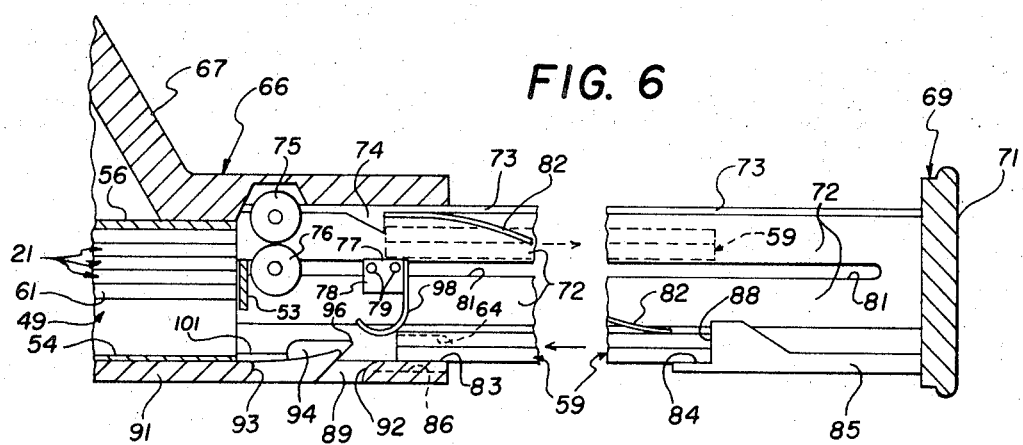
FIG. 6 is a somewhat schematic, cross-sectional view, taken along line 6—6 of FIG. 5, showing part of the camera of FIG. 5 in a moved position.
Figure 7:
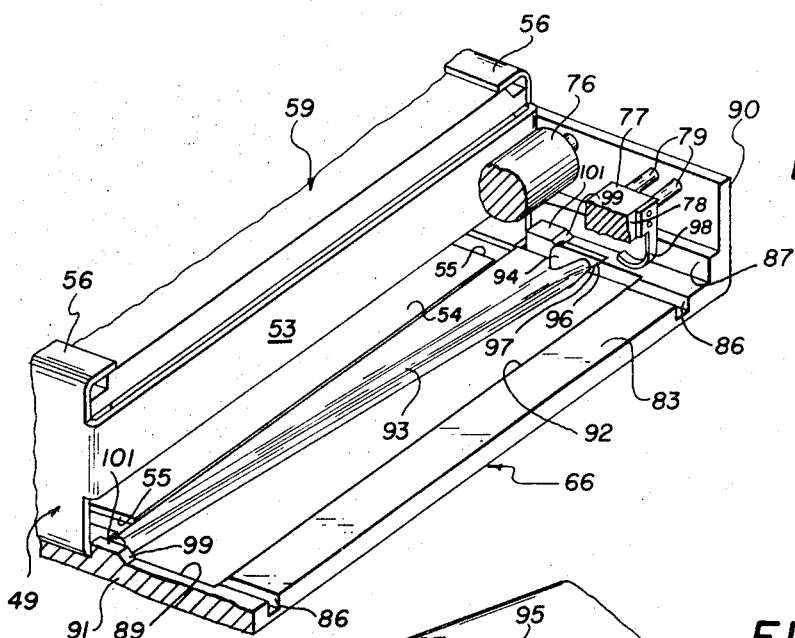
FIG. 7 is a fragmentary, perspective view of a portion of the camera of FIGS. 5 and 6, illustrating the stripping device therein constructed in accordance with the preferred embodiment of the present invention.
Figure 8:
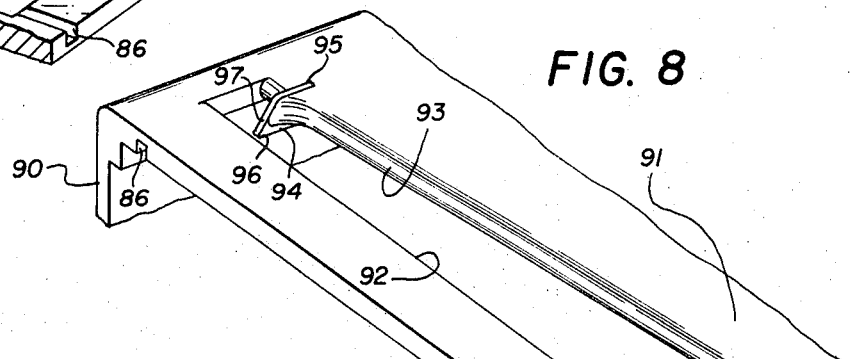
FIG. 8 is a perspective view of the rearward wall of the portion of the camera shown in FIG. 7, illustrating the exit slot through which stripped image-recording units emerge from the camera.

As best shown in FIGS. 6, 7, and 8, the exit slot 89 in the rear wall 91 of the camera housing includes a smooth, sloped, leading edge surface 92 disposed at right angles to the housing bottom and top walls 80 and 90, respectively, and a smooth, sloped, trailing or separating edge 93 disposed in angular or oblique transverse relation to walls 80 and 90. Alternatively, the leading edge of slot 89 could be parallel with the angularly disposed trailing edge. The essential feature is that the trailing edge be disposed at an angle relative to the leading edge of the image-recording unit being reinserted into the camera housing by drawer 69. Although omitted from the drawings for purposes of clarity, a resilient cover flap or the like could be provided across slot 89 to allow a print to emerge from the camera through that opening while inhibiting the entrance of light or foreign matter into the housing.

Figure 11:
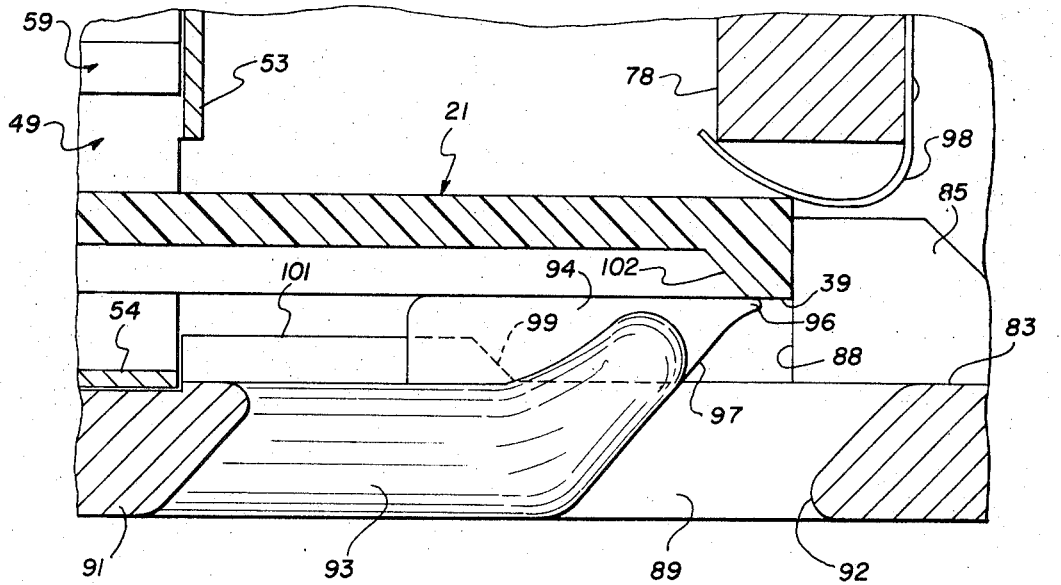

A metal stripping finger 94 is cemented or otherwise rigidly mounted in a slot 95 adjacent to the narrow end of slot 89, and includes a pointed tip 96 aligned with the stripping finger groove in the cover plate or film unit being returned to the film pack. As best illustrated in FIGS. 8, 10, and 11, the stripping finger includes a sloped, rearwardly facing guide edge 97 that merges with a smoothly contoured fillet at the adjacent end of the rounded trailing or separating edge 93 of slot 89. Instead of being made as a separate inserted piece, the stripping finger could be molded integrally with the molded plastic housing element that defines the exit opening. The illustrated construction is preferred, however, because of the greater strength afforded to the relatively thin tip of the stripping finger.

During the initial opening and closing movements of the drawer, which remove the forward cover plate from the film pack and reinsert it at the back of the film unit assemblage, neither the pressure rollers nor the stripping finger is required to perform any function. If the cover plate were not provided with a stripping finger groove 64, however, the square leading or trap edge of the plate would abut against the tip 96 of stripping finger 94 during the return movement of the plate, which would either block that movement or bend or break the finger. By including groove 64 in the cover plate, finger 94 can enter that groove in the manner described below with reference to the print stripping operation so that the plate can move past the finger without being damaged.

As the closing movement of drawer 69 slides the trap end of a film unit along surface 83 of the camera housing, a pair of springs 98 mounted at opposite ends of stripper guide bar 78 maintain the film unit frame in contact with that surface so that the tip 96 of stripping finger 94 enters the film unit groove 46 closely adjacent to its base surface 47 behind the overlapping corner of the image-recording unit.

Just before the endwise movement of the film unit has brought the sloped end surface 48 of groove 46 into contact with tip 96 of stripping finger 94, the leading or trap end of each film unit edge rib 38 encounters a corresponding ramp or cam surface 99 on the camera housing and is thereby cammed forwardly in opposition to the biasing force of springs 98, as shown in broken lines in FIG. 10. This forward movement of the leading end of the frame causes stripping finger tip 96 to peel the overlapping corner of the image-recording unit away from the frame and to direct that corner into exit slot 89. Such movement also brings the frame into supported contact with a pair of surfaces 101 on the camera housing that guide the frame into the rearward part of the film pack casing.

Figure 9:
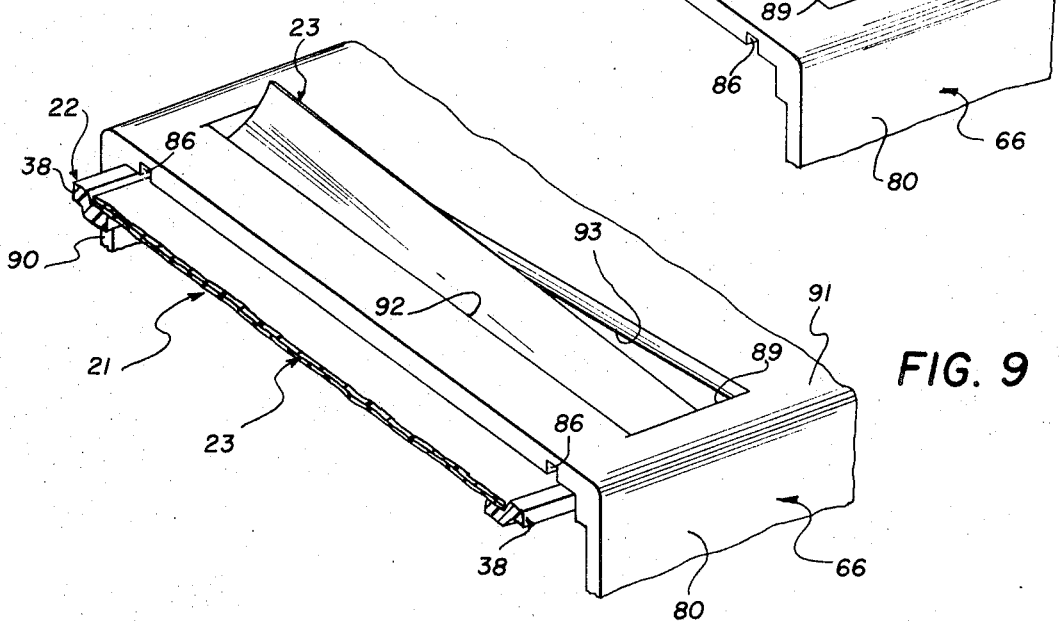
FIG. 9 corresponds to FIG. 8 and shows the leading end of an image-recording unit emerging through the exit slot.

After stripping finger 94 has begun to separate the adjacent corner of the image-recording unit from the frame, continued endwise movement of the frame causes that corner to emerge through exit slot 89, as shown in FIG. 9. Because of the acute angle between separating edge 93 and the leading edge of the emerging image recording unit, that edge of the unit progressively traverses edge 93. Such progressively traversing movement bows or curls the unit edge rearwardly along a bending region extending across the unit at an acute angle to its leading edge. After the image-recording unit has begun to emerge through the exit slot, its angular transverse bending region continues to be displaced toward the trailing end of the unit as the margins of the unit are thereby progressively separated from the frame rails. Because the separation of the image-recording unit from the frame commences only at one leading corner of the unit rather than simultaneously at both leading corners, the angular transverse bowing or flexure of the unit is substantially unopposed by concurrent longitudinal bowing influences, thus ensuring smooth and positive separation of the unit from the frame and substantially eliminating the aforementioned causes of jamming and other malfunctions.

After the image-recording unit has been completely separated from the frame, the sloped inner face 102 of the frame end rib 39 engages stripping finger tip 96 and cams the trailing end of the frame forwardly to allow rib 39 to pass finger 94 during the final portion of the closing movement of the drawer. Because the separating operation has been completed, the only force imparted to the stripping finger by this camming action is that required to overcome the relatively slight opposition of springs 98, which is insufficient to cause any damage to the finger.

Although the preferred embodiment of the present invention uses a stripping finger rigidly supported on the camera housing, it should be recognized that the finger could be movably mounted to allow it to retract from the stripping finger groove and to be bypassed by the end of the frame in a manner disclosed, for example, in commonly assigned, copending U.S. Pat. application Ser. No. 159,323, entitled PRINT STRIPPING MECHANISM and filed July 2, 1971 in the name of Donald M. Harvey.

The invention has been described in detail with particular reference to the preferred embodiment thereof, but it will be understood that variations and modifications can be effected within the spirit and scope of the invention.

What is claimed is:

1. A stripping device for separating an image-recording element of a self-processing film unit from a carrier to which the element is strippably attached, the element including first and second lateral edge portions and a central portion having a width extending from the first lateral edge portion to the second lateral edge portion, said device comprising:
   a. means for effecting movement of the film unit in a predetermined direction;
   b. a stripping finger including means defining a first surface disposed to lie substantially parallel with the carrier during said movement of the film unit and a second surface disposed at an angle relative to said first surface for engaging the first lateral edge portion of the element during said movement to separate the element from the carrier at the first lateral edge portion; and
   c. a separating edge surface extending from said finger in an oblique transverse direction relative to said predetermined direction, and having a length substantially equal to the width of the central portion of the element, for progressively engaging the central portion to progressively separate the element from the carrier during said movement of the film unit.

2. A stripping mechanism for separating from a substantially rigid frame an image-recording element of a self-processing film unit attached to the frame, the element including first and second lateral edge portions and a central portion having a width extending from the first lateral edge portion to the second lateral edge portion, said mechanism comprising:
   a. means defining a chamber or receiving the frame and an entrance to said chamber;
   b. means for effecting movement of the frame along a substantially straight path from a position outside said chamber to a position inside said chamber through said entrance;
   c. a stripping finger extending into said path outside said chamber for engaging the first lateral edge portion of the element to initiate separation of the element from the frame at the first lateral edge portion during said movement of the frame; and
   d. a separating member extending from said finger in an angular transverse direction relative to said path, and having a length substantially equal to the width of the central portion of the element, for progressively engaging the central portion to progressively separate the element from the frame and direct the element away from said entrance during said movement of the frame.

3. For use in photographic apparatus adapted to expose and initiate processing of a self-processing film unit having an image-recording element separably coupled to a carrier, the element including a first lateral marginal portion having a first width, a second lateral marginal portion having a second width, and a central portion having a third width extending from the first lateral marginal portion to the second lateral marginal portion, the apparatus having means for effecting movement of the carrier along a predetermined path, a device for separating the element from the carrier during the movement of the carrier, said device comprising:
   a. a finger for entering between the first lateral marginal portion of the element and the carrier to effect separation of the element from the carrier at the first lateral marginal portion;
   b. a member extending from said finger in an oblique transverse direction relative to the path, and having a length substantially equal to the second width plus the third width, for progressively entering between the central and second lateral marginal portions of the element and the carrier to effect separation of the element from the carrier at the central and second lateral marginal portions; and
   c. means defining at least one camming surface in said path for engaging the carrier and effecting relative movement between said finger and the carrier away from each other to facilitate said separation of the element from the carrier.

4. The device claimed in claim 3 wherein said finger is fixedly mounted; and wherein said camming surface cams the carrier away from said finger.

5. The device claimed in claim 3 wherein said finger is fixedly mounted; and further comprising means for resiliently biasing the carrier toward said finger and for permitting the carrier to move away from said finger.

6. For use in a camera adapted to expose and initiate processing of a film unit — the film unit including a substantially rectangular image-recording element having a leading edge portion, first and second lateral marginal portions, and a central portion intermediate the lateral marginal portions; a substantially rigid frame having a leading end, first and second lateral border portions, and a groove in the first lateral border portion extending longitudinally from the leading end; and means separably coupling the first and second lateral marginal portions to the first and second lateral border portions, respectively, the leading edge portion being spaced from the leading end and overlying the groove — a device for effecting separation of the image-recording element from the frame, said device comprising:
 a. guiding means for guiding movement of the film unit along a predetermined path;
 b. a finger mounted in fixed relation to said guiding means and extending into said path for alignment with the first lateral border portion during said movement of the film unit to enter the groove at the leading end, engage the leading edge portion overlying the groove, and thereby effect separation of the first lateral marginal portion from the first lateral border portion during said movement; and
 c. a member extending from said finger obliquely across said path, and in angular relation to the leading edge portion during said movement of the film unit, to a portion of said member disposed for alignment with the second lateral border portion to progressively enter between the central and second lateral marginal portions of the element and the frame to thereby progressively effect separation of the central and second lateral marginal portions from the frame during said movement.

7. For use in a camera adapted to expose and initiate processing of a film unit — the film unit including a substantially rectangular image-recording element having a leading edge portion, first and second lateral marginal portions, and a central portion intermediate the lateral marginal portions; a substantially rigid frame having a leading end, first and second lateral border portions, and a groove in the first lateral border portion extending longitudinally from the leading end; and means separably coupling the first and second lateral marginal portions to the first and second lateral border portions, respectively, the leading edge portion being spaced from the leading end and overlying the groove — a device for effecting separation of the image-recording element from the frame, said device comprising:
 a. guiding means for guiding initial movement and then further movement of the frame endwise along a predetermined path;
 b. separating means for separating the image-recording element from the frame, said separating means including:
  1. a finger extending into said path for alignment with the first lateral border portion to enter the groove at the leading end, engage the leading edge portion overlying the groove, and thereby initiate separation of the first lateral marginal portion from the first lateral border portion during said initial movement, and
  2. a member extending from said finger obliquely across said path to a portion of said member disposed for alignment with the second lateral border portion to progressively enter between the central and second lateral marginal portions of the element and the frame to thereby progressively initiate separation of the central and second lateral marginal portions from the frame during said further movement;
 c. biasing means for resiliently biasing the frame toward said separating means; and
 d. camming means extending into said path for camming the frame away from said separating means in opposition to said biasing means during said initial movement to facilitate the separation of the image-recording element from the frame.

* * * * *

UNITED STATES PATENT OFFICE
CERTIFICATE OF CORRECTION

Patent No. 3,721,171    Dated March 20, 1973

Inventor(s) Frederick W. Kern

It is certified that error appears in the above-identified patent and that said Letters Patent are hereby corrected as shown below:

In col. 1, line 4, ", copending" should be deleted; line 5, after "111,464," --now U.S. Patent No. 3,691,920,--should be inserted; line 8, "3691920" should be changed to --3,709,126,--; line 10, after "159,323," --now U.S. Pat. No. 3,673,940,-- should be inserted. In col. 2, lines 56 and 57, ", copending" should be deleted; line 57, after "111,472," --now U.S. Pat. No. 3,709,126,-- should be inserted. In col. 6, line 57, ", copending" should be deleted; line 57, "3691920" should be changed to --3,691,920,--. In col. 9, line 2, "imageurecording" should be changed to --image-recording--; line 37, ", copending" should be deleted; line 38, after "159,323," --now U.S. Pat. No. 3,673,940,-- should be inserted.

Signed and sealed this 23rd day of July 1974.

(SEAL)
Attest:

McCOY M. GIBSON, JR.
Attesting Officer

C. MARSHALL DANN
Commissioner of Patents